(12) United States Patent
Lin

(10) Patent No.: US 7,871,081 B1
(45) Date of Patent: Jan. 18, 2011

(54) AIR-CUSHION TYPE SHOCK ABSORBING SYSTEM THAT IS OPERATED IN A WIRELESS CONTROLLING MANNER

(75) Inventor: Cheng-Hsiung Lin, Changhua Hsien (TW)

(73) Assignee: Pin Hsiu Rubber Co., Ltd., Changhua Hsien (TW)

( * ) Notice: Subject to any disclaimer, the term of this patent is extended or adjusted under 35 U.S.C. 154(b) by 246 days.

(21) Appl. No.: 12/180,679

(22) Filed: Jul. 28, 2008

(51) Int. Cl.
*B60G 17/04* (2006.01)

(52) U.S. Cl. ............................. 280/5.504; 280/124.159

(58) Field of Classification Search .............. 280/5.515, 280/5.514, 6.157, 124.158, 124.159, 124.16
See application file for complete search history.

(56) References Cited

U.S. PATENT DOCUMENTS

| | | | | |
|---|---|---|---|---|
| 4,659,104 A * | 4/1987 | Tanaka et al. | ............ | 280/6.158 |
| 4,696,483 A * | 9/1987 | Takizawa et al. | ......... | 280/5.514 |
| 6,581,918 B2 | 6/2003 | Voelkel | | |
| 6,607,186 B2 | 8/2003 | Voelkel | | |
| 7,287,760 B1 * | 10/2007 | Quick et al. | ............. | 280/5.512 |
| 7,380,799 B2 * | 6/2008 | Niaura et al. | ............ | 280/5.519 |
| 7,621,538 B2 * | 11/2009 | Nordmeyer et al. | ...... | 280/5.515 |
| 7,637,517 B2 * | 12/2009 | Misawa | ................. | 280/124.16 |
| 7,644,933 B2 * | 1/2010 | Brookes et al. | .......... | 280/5.502 |
| 7,722,017 B2 * | 5/2010 | Holbrook et al. | ......... | 267/64.16 |
| 2004/0150173 A1 * | 8/2004 | Burdock et al. | .......... | 280/5.514 |
| 2007/0200304 A1 * | 8/2007 | Brookes et al. | .......... | 280/5.514 |
| 2007/0255466 A1 * | 11/2007 | Chiao | .......................... | 701/37 |

* cited by examiner

*Primary Examiner*—Paul N Dickson
*Assistant Examiner*—Drew Brown
(74) *Attorney, Agent, or Firm*—Alan Kamrath; Kamrath & Associates PA

(57) ABSTRACT

A shock absorbing system includes an air container, a power source to supply a high-pressure air into the air container, a plurality of shock absorbers each provided with at least one air spring, a central controller including a plurality of control units each connected between the air container and a respective one of the shock absorbers, and a drive unit to control operation of the central controller in a wireless way. Thus, each of the shock absorbers can be lifted to lift the chassis of the car so as to prevent the chassis from being worn out or broken due to a violent hit when the car passes a rugged road and can be lowered to lower the chassis of the car so as to enhance maneuverability of the car.

16 Claims, 3 Drawing Sheets

AIR-CUSHION TYPE SHOCK ABSORBING SYSTEM THAT IS OPERATED IN A WIRELESS CONTROLLING MANNER

BACKGROUND OF THE INVENTION

1. Field of the Invention

The present invention relates to a shock absorbing system and, more particularly, to an air-cushion type shock absorbing system for a wheeled vehicle, such as an automobile and the like.

2. Description of the Related Art

A conventional shock absorbing system for a car is mounted on the chassis of the car to provide a shock-absorbing effect to the user. The shock absorbing system can be micro-adjusted to lift the chassis of the car so as to prevent the chassis of the car from being worn out or broken due to a violent hit when the car passes a rugged road. Alternatively, the shock absorbing system can also be micro-adjusted to lower the chassis of the car so as to enhance maneuverability of the car. However, the shock absorbing system cannot be micro-adjusted easily and quickly.

The closest prior art references of which the applicant is aware were disclosed in U.S. Pat. Nos. 6,581,918 and 6,607,186.

BRIEF SUMMARY OF THE INVENTION

In accordance with the present invention, there is provided a shock absorbing system, comprising an air container, a power source connected to the air container to supply a high-pressure air into the air container, a plurality of shock absorbers each provided with at least one air spring, a central controller connected between the air container and the shock absorbers and including a plurality of control units each connected between the air container and a respective one of the shock absorbers to transmit the high-pressure air in the air container into the respective shock absorber so as to inflate the air spring of the respective shock absorber or to drain the high-pressure air outwardly from the respective shock absorber so as to deflate the air spring of the respective shock absorber, and a drive unit connected to the central controller in a wireless way to control operation of the central controller.

The primary objective of the present invention is to provide an air-cushion type shock absorbing system that is operated in a wireless controlling manner.

Another objective of the present invention is to provide a shock absorbing system, wherein each of the shock absorbers can be lifted and lowered to lift and lower the chassis (or the car body) of the car so as to adjust the height of the chassis according to the practical requirement.

A further objective of the present invention is to provide a shock absorbing system, wherein each of the shock absorbers can be lifted to lift the chassis of the car so as to prevent the chassis of the car from being worn out or broken due to a violent hit when the car passes a rugged road and can be lowered to lower the chassis of the car so as to enhance maneuverability of the car.

A further objective of the present invention is to provide a shock absorbing system, wherein movement of each of the shock absorbers is controlled by a wireless signal transmission without having to provide any signal line, thereby facilitating assembly of the shock absorbing system.

A further objective of the present invention is to provide a shock absorbing system, wherein the shock absorbers can be controlled individually by the first switches of the drive unit and can be controlled simultaneously by the second switch of the drive unit, thereby facilitating the driver operating the shock absorbing system.

A further objective of the present invention is to provide a shock absorbing system, wherein the second indication light of the drive unit can indicate the lifting condition of each of the shock absorbers by provision of the wireless pressure detector of the air container and can indicate the lowering condition of each of the shock absorbers by provision of the wireless pressure detector of each of the control units, so that the drive can understand the lifting and lowering conditions of the chassis of the car so as to enhance the driving safety.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
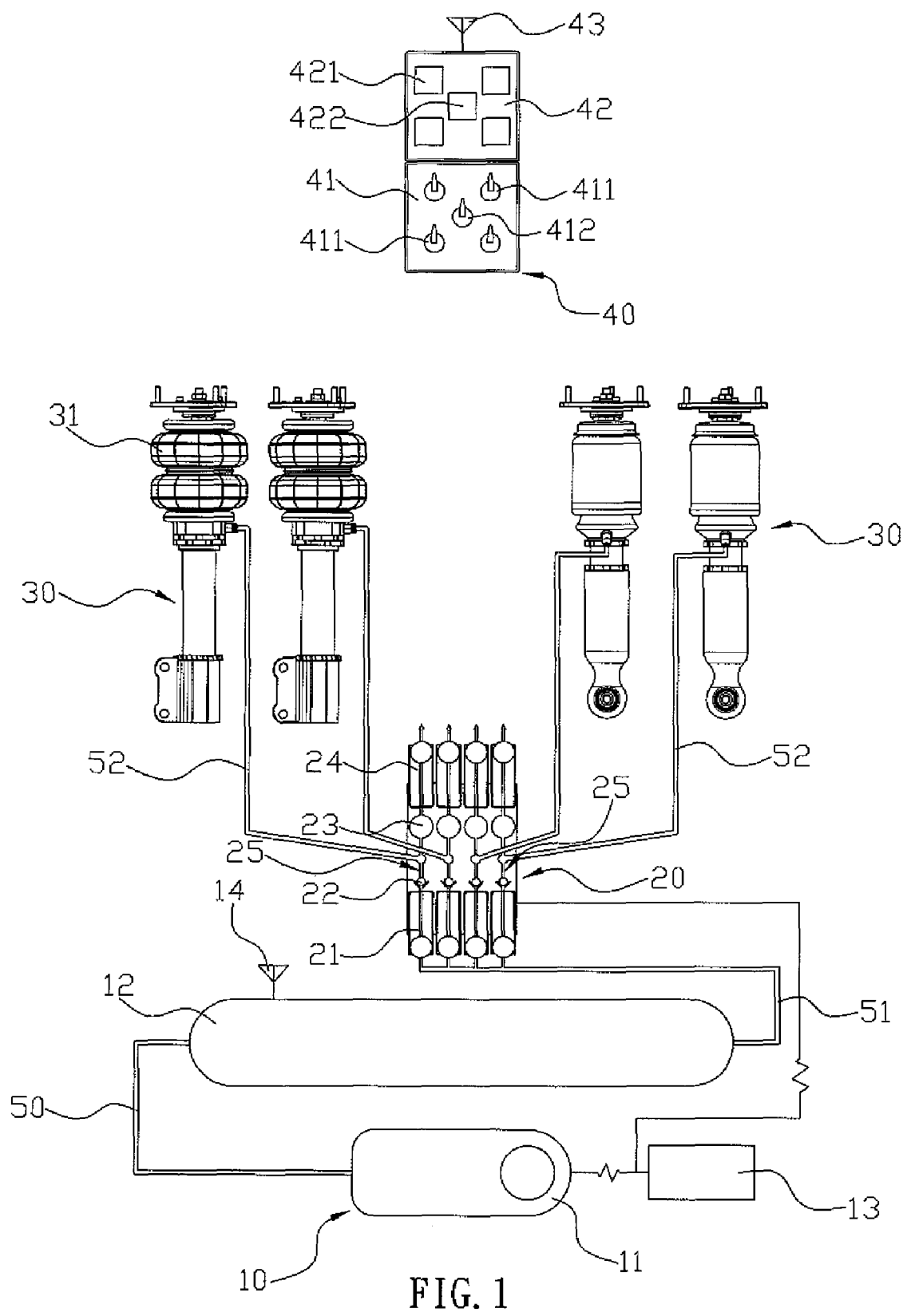
FIG. 1 is a schematic layout diagram of a shock absorbing system in accordance with the preferred embodiment of the present invention.

Referring to the drawings and initially to FIG. 1, a shock absorbing system in accordance with the preferred embodiment of the present invention is mounted on a wheeled vehicle, such as an automobile and the like, and comprises an air container 12, a power source 10 connected to the air container 12 to supply a high-pressure air into the air container 12, a plurality of shock absorbers 30 each provided with at least one air spring 31, a central controller 20 connected between the air container 12 and the shock absorbers 30 and including a plurality of control units 25 each connected between the air container 12 and a respective one of the shock absorbers 30 to transmit the high-pressure air in the air container 12 into the respective shock absorber 30 so as to inflate the air spring 31 of the respective shock absorber 30 or to drain the high-pressure air outwardly from the respective shock absorber 30 so as to deflate the air spring 31 of the respective shock absorber 30, and a drive unit 40 connected to the central controller 20 in a wireless way to control operation of the central controller 20.

The power source 10 is mounted in the glove compartment (not shown) of the car. The power source 10 is provided with an air compressor 11 to produce the high-pressure air. The power source 10 is externally connected to a battery 13 which supplies an electric energy to the air compressor 11 for operation of the air compressor 11. The air container 12 is externally connected to a wireless pressure detector 14 to detect a pressure value of the power source 10 so that the driver can obtain the pressure value of the power source 10.

The shock absorbing system further comprises a high-pressure air pipe 50 having a first end connected to the power source 10 and a second end connected to the air container 12 so that the power source 10 is connected to the air container 12 via the high-pressure air pipe 50, and a high-pressure air inlet pipe 51 having a first end connected to the air container 12 and a second end connected to each of the control units 25 of the central controller 20 so that the air container 12 is connected to each of the control units 25 of the central controller 20 via the high-pressure air inlet pipe 51.

The central controller 20 is mounted at a determined position of the car. Each of the control units 25 of the central controller 20 controls operation of the respective shock absorber 30 individually. Each of the control units 25 of the central controller 20 includes an air inlet electromagnetic valve 21, a check valve 22, a wireless pressure detector 23 and an air outlet electromagnetic valve 24. The air inlet electromagnetic valve 21 of each of the control units 25 is connected to the high-pressure air inlet pipe 51. The check valve 22 of each of the control units 25 is located between the air inlet electromagnetic valve 21 and the air outlet electromagnetic valve 24 and is located between the air inlet electromagnetic valve 21 and the respective shock absorber 30 to allow the high-pressure air in the air container 12 to pass through the air inlet electromagnetic valve 21 into the respective shock absorber 30 and to prevent the high-pressure air in the respective shock absorber 30 from flowing back from the air inlet electromagnetic valve 21 into the air container 12. The wireless pressure detector 23 of each of the control units 25 is located between the check valve 22 and the air outlet electromagnetic valve 24.

In practice, the air inlet electromagnetic valve 21 and the air outlet electromagnetic valve 24 of each of the control units 25 is directly controlled by a wireless signal produced by the drive unit 40, and the wireless pressure detector 23 of each of the control units 25 produces an opposite wireless feedback signal and transmits the wireless feedback signal to the drive unit 40.

The shock absorbing system further comprises a plurality of high-pressure connecting pipes 52 each having a first end connected to a respective one of the control units 25 of the central controller 20 and a second end connected to a respective one of the shock absorbers 30. Each of the high-pressure connecting pipes 52 is connected between the check valve 22 and the wireless pressure detector 23 of the respective control unit 25.

Each of the shock absorbers 30 is mounted on the chassis (not shown) of the car. The air spring 31 of each of the shock absorbers 30 can be compressed and expanded to provide a shock-absorbing effect to the car.

The drive unit 40 is mounted on the driver's seat (not shown) of the car. The drive unit 40 includes an operation panel 41, an indication panel 42 and an antenna 43. The operation panel 41 of the drive unit 40 is provided with a plurality of first switches 411 each of which is operated to control operation of a respective one of the control units 25 of the central controller 20 individually. The operation panel 41 of the drive unit 40 is further provided with a second switch 412 that is operated to control operation of each of the control units 25 of the central controller 20 simultaneously. The indication panel 42 of the drive unit 40 is provided with a plurality of first indication lights 421 each corresponding to a respective one of the first switches 411 of the operation panel 41 to indicate operation of a respective one of the control units 25 of the central controller 20, and a second indication light 422 corresponding to the second switch 412 of the operation panel 41 to indicate operation of the control units 25 of the central controller 20, so that the driver can see operation of each of the shock absorbers 30. The antenna 43 of the drive unit 40 is connected to each of the control units 25 of the central controller 20 to control operation of each of the control units 25 of the central controller 20 in a wireless manner.

Figure 2:
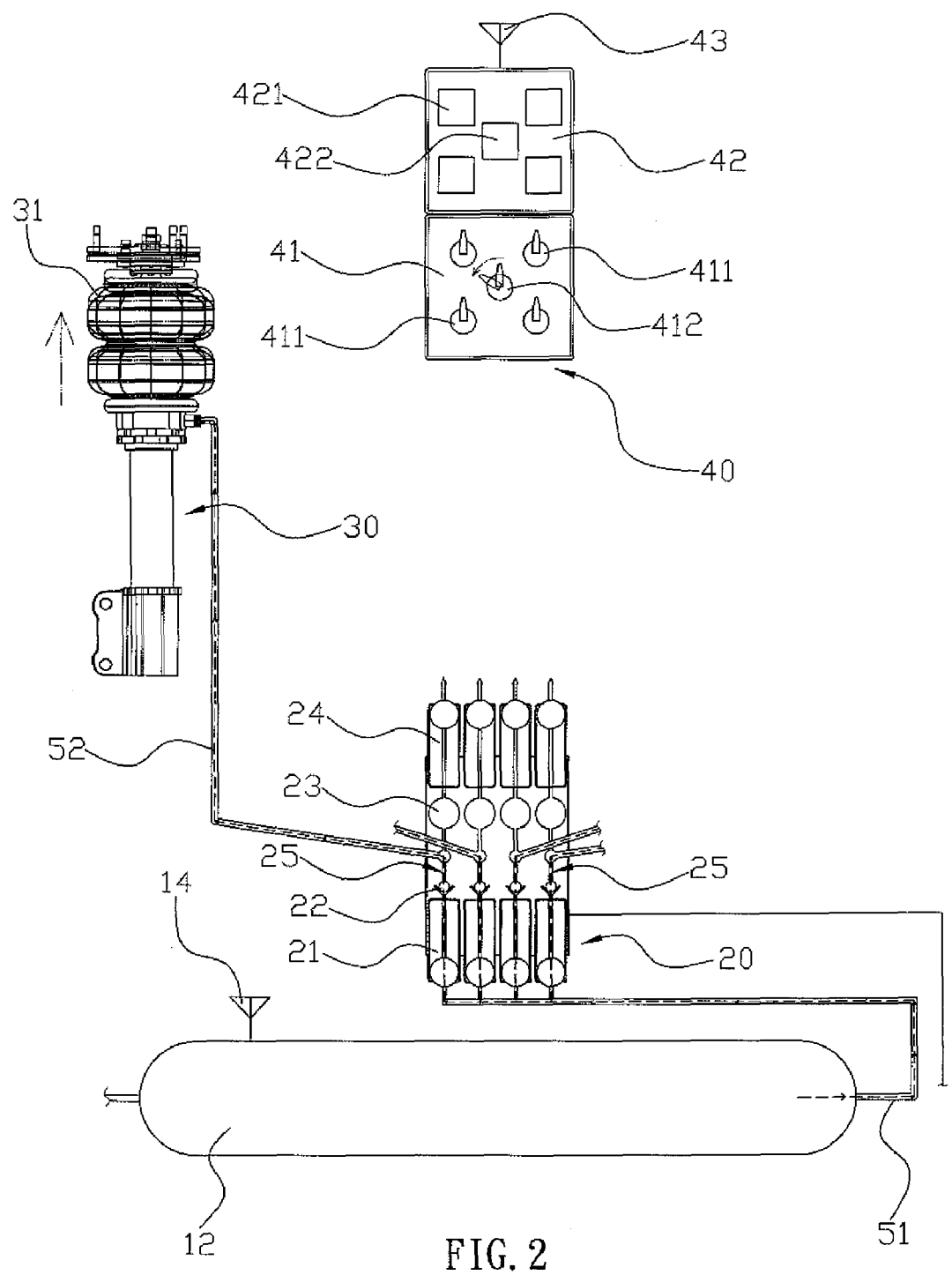
FIG. 2 is a schematic operational view of the shock absorbing system as shown in FIG. 1.

In operation, referring to FIG. 2 with reference to FIG. 1, when the driver wishes to lift the shock absorbers 30, the second switch 412 of the drive unit 40 is switched to a positive position to open the air inlet electromagnetic valves 21 of the control units 25 via the antenna 43 simultaneously, so that the high-pressure air in the air container 12 is allowed to pass through the high-pressure air inlet pipe 51, the air inlet electromagnetic valve 21 and the check valve 22 of each of the control units 25 and each of the high-pressure connecting pipes 52 into each of the shock absorbers 30 so as to inflate the air spring 31 of each of the shock absorbers 30 and to lift each of the shock absorbers 30. After the second switch 412 of the drive unit 40 is returned to the original neutral position, the air inlet electromagnetic valves 21 of the control units 25 are closed simultaneously, so that each of the shock absorbers 30 is disposed at the lifted state to lift the chassis (or the car body) of the car so as to prevent the chassis of the car from being worn out due to hit when the car passes a rugged road. At the same time, when the high-pressure air flows outwardly from the air container 12, the wireless pressure detector 14 connected to the air container 12 detects the pressure of the high-pressure air and produces a wireless feedback signal which is transmitted to the drive unit 40 so that the second indication light 422 of the drive unit 40 can indicate the pressure value of the high-pressure air. Thus, the driver can understand if the pressure value of the high-pressure air of the power source 10 is enough.

Figure 3:
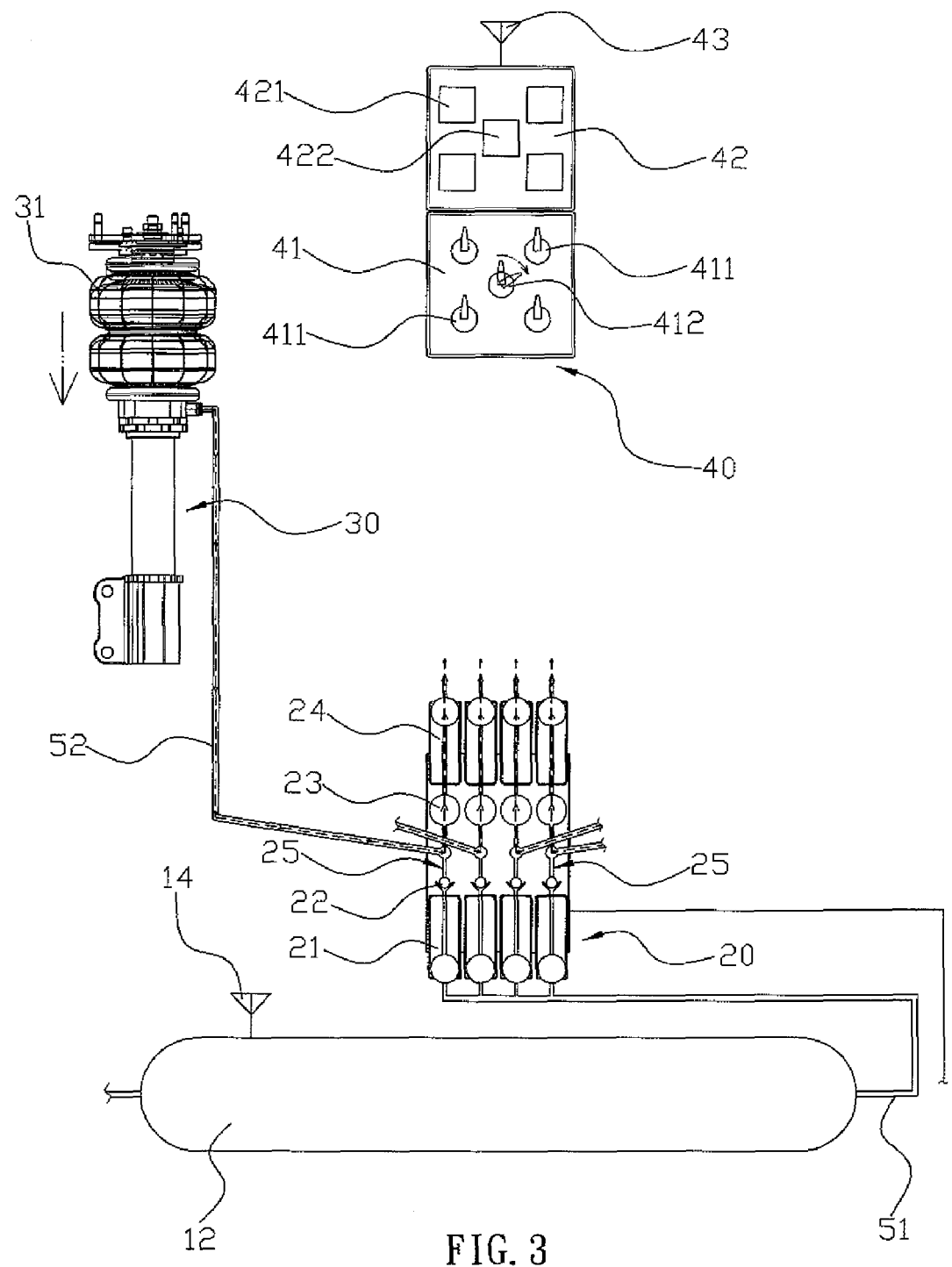
FIG. 3 is a schematic operational view of the shock absorbing system as shown in FIG. 1.

On the contrary, referring to FIG. 3 with reference to FIG. 1, when the driver wishes to lower the shock absorbers 30, the second switch 412 of the drive unit 40 is switched to a negative position to open the air outlet electromagnetic valves 24 of the control units 25 via the antenna 43 simultaneously, so that the high-pressure air in each of the shock absorbers 30 is allowed to pass through each of the high-pressure connecting pipes 52 and the air outlet electromagnetic valve 24 of each of the control units 25 and is drained outwardly from the air outlet electromagnetic valve 24 of each of the control units 25 so as to deflate the air spring 31 of each of the shock absorbers 30 and to lower each of the shock absorbers 30. After the second switch 412 of the drive unit 40 is returned to the original neutral position, the air inlet electromagnetic valves 21 of the control units 25 are closed simultaneously, so that each of the shock absorbers 30 is disposed at the lowered state to lower the chassis (or the car body) of the car so as to enhance maneuverability of the car. At the same time, when the high-pressure air flows through the air outlet electromagnetic valve 24 of each of the control units 25, the wireless pressure detector 23 of each of the control units 25 detects the pressure of the high-pressure air and produces a wireless feedback signal which is transmitted to the drive unit 40 so that the second indication light 422 of the drive unit 40 can indicate the pressure value of the high-pressure air. Thus, the driver can understand if the chassis (or the car body) of the car is disposed at a balance state.

In addition, each of the first switches 411 of the drive unit 40 is used to control operation of a respective one of the control units 25 of the central controller 20 to control operation of a respective one of the shock absorbers 30 so as to micro-adjust the height of the respective shock absorber 30.

Accordingly, each of the shock absorbers 30 can be lifted and lowered to lift and lower the chassis (or the car body) of the car so as to adjust the height of the chassis according to the practical requirement. In addition, each of the shock absorbers 30 can be lifted to lift the chassis of the car so as to prevent the chassis of the car from being worn out or broken due to a violent hit when the car passes a rugged road and can be lowered to lower the chassis of the car so as to enhance maneuverability of the car. Further, movement of each of the shock absorbers 30 is controlled by a wireless signal transmission without having to provide any signal line, thereby facilitating assembly of the shock absorbing system. Further, the shock absorbers 30 can be controlled individually by the first switches 411 of the drive unit 40 and can be controlled simultaneously by the second switch 412 of the drive unit 40, thereby facilitating the driver operating the shock absorbing system. Further, the second indication light 422 of the drive unit 40 can indicate the lifting condition of each of the shock absorbers 30 by provision of the wireless pressure detector 14 of the air container 12 and can indicate the lowering condition of each of the shock absorbers 30 by provision of the wireless pressure detector 23 of each of the control units 25, so that the drive can understand the lifting and lowering conditions of the chassis of the car so as to enhance the driving safety.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A shock absorbing system, comprising:
   an air container;
   a power source connected to the air container to supply a high-pressure air into the air container;
   a plurality of shock absorbers each provided with at least one air spring;
   a central controller connected between the air container and the shock absorbers and including a plurality of control units each connected between the air container and a respective one of the shock absorbers to transmit the high-pressure air in the air container into the respective shock absorber so as to inflate the air spring of the respective shock absorber or to drain the high-pressure air outwardly from the respective shock absorber so as to deflate the air spring of the respective shock absorber;
   a drive unit connected to the central controller in a wireless way to control operation of the central controller;
   a high-pressure air inlet pipe having a first end connected to the air container and a second end connected to each of the control units of the central controller so that the air container is connected to each of the control units of the central controller via the high-pressure air inlet pipe;
   wherein each of the control units of the central controller includes an air inlet electromagnetic valve, a check valve, a wireless pressure detector and an air outlet electromagnetic valve;
   the air inlet electromagnetic valve of each of the control units is connected to the high-pressure air inlet pipe;
   the check valve of each of the control units is located between the air inlet electromagnetic valve and the respective shock absorber to allow the high-pressure air in the air container to pass through the air inlet electromagnetic valve into the respective shock absorber and to prevent the high-pressure air in the respective shock absorber from flowing back from the air inlet electromagnetic valve into the air container;
   the wireless pressure detector of each of the control units is located between the check valve and the air outlet electromagnetic valve.

2. The shock absorbing system in accordance with claim 1, wherein the air container is externally connected to a wireless pressure detector to detect a pressure value of the power source.

3. The shock absorbing system in accordance with claim 1, further comprising:
   a high-pressure air pipe having a first end connected to the power source and a second end connected to the air container so that the power source is connected to the air container via the high-pressure air pipe.

4. The shock absorbing system in accordance with claim 1, further comprising:
   a plurality of high-pressure connecting pipes each having a first end connected to a respective one of the control units of the central controller and a second end connected to a respective one of the shock absorbers.

5. The shock absorbing system in accordance with claim 4, wherein each of the high-pressure connecting pipes is connected between the check valve and the wireless pressure detector of the respective control unit.

6. The shock absorbing system in accordance with claim 1, wherein the power source is provided with an air compressor to produce the high-pressure air.

7. The shock absorbing system in accordance with claim 6, wherein the power source is externally connected to a battery which supplies an electric energy to the air compressor.

8. The shock absorbing system in accordance with claim 1, wherein the check valve of each of the control units is located between the air inlet electromagnetic valve and the air outlet electromagnetic valve.

9. The shock absorbing system in accordance with claim 1, wherein
   the air inlet electromagnetic valve and the air outlet electromagnetic valve of each of the control units is directly controlled by a wireless signal produced by the drive unit;
   the wireless pressure detector of each of the control units produces an opposite wireless feedback signal and transmits the wireless feedback signal to the drive unit.

10. The shock absorbing system in accordance with claim 1, wherein each of the control units of the central controller controls operation of the respective shock absorber individually.

11. The shock absorbing system in accordance with claim 1, wherein the power source is mounted in a glove compartment of a car.

12. The shock absorbing system in accordance with claim 1, wherein each of the shock absorbers is mounted on a chassis of a car.

13. The shock absorbing system in accordance with claim 1, wherein the drive unit is mounted on a driver's seat of a car.

14. A shock absorbing system, comprising:
   an air container;
   a power source connected to the air container to supply a high-pressure air into the air container;
   a plurality of shock absorbers each provided with at least one air spring;
   a central controller connected between the air container and the shock absorbers and including a plurality of control units each connected between the air container and a respective one of the shock absorbers to transmit the high-pressure air in the air container into the respective shock absorber so as to inflate the air spring of the respective shock absorber or to drain the high-pressure air outwardly from the respective shock absorber so as to deflate the air spring of the respective shock absorber;
   a drive unit connected to the central controller in a wireless way to control operation of the central controller; wherein
   the drive unit includes an operation panel, an indication panel and an antenna;
   the operation panel of the drive unit is provided with a plurality of first switches each of which is operated to control operation of a respective one of the control units of the central controller individually;

the operation panel of the drive unit is further provided with a second switch that is operated to control operation of each of the control units of the central controller simultaneously.

15. The shock absorbing system in accordance with claim 14, wherein the indication panel of the drive unit is provided with a plurality of first indication lights each corresponding to a respective one of the first switches of the operation panel to indicate operation of a respective one of the control units of the central controller;

the indication panel of the drive unit is further provided with a second indication light corresponding to the second switch of the operation panel to indicate operation of the control units of the central controller.

16. The shock absorbing system in accordance with claim 14, wherein the antenna of the drive unit is connected to each of the control units of the central controller to control operation of each of the control units of the central controller in a wireless manner.

* * * * *